United States Patent [19]

Morimoto

[11] Patent Number: 4,558,828

[45] Date of Patent: Dec. 17, 1985

[54] FISHING REEL

[75] Inventor: Shinichi Morimoto, Nishinomiya, Japan

[73] Assignee: Shimano Industrial Company Limited, Osaka, Japan

[21] Appl. No.: 601,319

[22] Filed: Apr. 17, 1984

[30] Foreign Application Priority Data

Apr. 20, 1983 [JP] Japan .............................. 58-60278[U]

[51] Int. Cl.[4] .............................................. A01K 89/02
[52] U.S. Cl. .................................................. 242/7.19
[58] Field of Search ............... 242/211, 212, 213, 214, 242/216, 217, 218, 219, 220, 221, 84.1 J, 84.1 R, 84.5 R, 84.51 R, 99

[56] References Cited

U.S. PATENT DOCUMENTS

| 691,073 | 1/1902 | Rabbett | 242/217 |
| 2,006,481 | 7/1935 | Russell | 242/212 |
| 3,129,609 | 4/1964 | Rouanet | 242/217 |
| 3,718,291 | 2/1973 | Lemery | 242/84.1 J |
| 4,222,537 | 9/1980 | Noda | 242/217 |

Primary Examiner—Billy S. Taylor
Attorney, Agent, or Firm—Stevens, Davis, Miller & Mosher

[57] ABSTRACT

A fishing reel is provided which includes a reel body, a spool having a spool shaft rotatably supported to the reel body, a handle shaft rotatably supported to the reel body, a handle supported to the handle shaft for applying to the spool a driving force, a transmission mechanism for transmitting the driving force from the handle to the spool and a drag mechanism for applying a resistance to reverse rotation of the handle relative to the handle shaft. The handle shaft projects outwardly relative to the reel body, and the handle is supported on the handle shaft at an intermediate portion thereof, with the handle shaft also projecting outwardly relative to the handle. The handle is interposed between the reel body and the drag mechanism.

3 Claims, 4 Drawing Figures

FISHING REEL

FIELD OF THE INVENTION

This invention relates to a fishing reel, and more particularly, to a fishing reel which supports a spool rotatably to a reel body through a spool shaft so that a handle supported to the reel body is rotated to drive the spool.

BACKGROUND OF THE INVENTION

Generally, fishing reels, which support the spool to the reel body and drives the spool by rotating the handle for winding up a fishing line on the spool, are well-known as double bearing reel or single bearing reels.

Such reels are constructed such that a handle shaft parallel to a spool shaft is supported rotatably to the reel body, the handle is fixed to the end of the handle shaft projecting outwardly from the reel body, and friction plates at a drag mechanism together with a main gear are supported to the handle shaft entering into the reel body. The friction plates are urged toward the main gear by use of a drag knob screwable with the projecting end of the handle shaft to thereby transmit a driving force from the handle to the main gear through the handle shaft and drag mechanism and then to the spool shaft and spool through the main gear and a pinion, thereby driving the spool.

In other words, the drag mechanism in the conventional reel is interposed between the handle and the main gear, with the handle being provided axially apart from the spool with respect to the axial center thereof.

The fishing reel, especially the double bearing reel, is provided at the position corresponding to the axial center of the spool with a reel mounting leg for mounting the reel to a fishing rod.

The handle, as noted above, is positioned axially outwardly apart from the axial center of the spool because the drag mechanism is interposed between the main gear and the handle so as to enlarge the distance between the handle and the rod to an extent of the axial length of the drag mechanism. Hence, when the handle is rotated to wind up the fishing line onto the spool, the moment of rotation around the rod acts on the reel and rod due to the driving force of the handle, thereby creating a problem in that the handle operation may be difficult.

Also, the friction plates at the drag mechanism are housed in the reel body, whereby the drag mechanism is restricted in size. As a result, a problem also is created in that the dragging force cannot be increased more than a predetermined value, but also fine adjustment thereof is structurally impossible.

SUMMARY OF THE INVENTION

An object of the invention is to provide a fishing reel which has a drag mechanism not housed in the reel body but provided outwardly therefrom and positioned axially outside the handle to reduce a distance between the handle and the axial center of the spool. This provides advantages in that when the handle is rotated to wind up the line, the moment of rotation acting on the reel and rod can be minimized, the handle operation is easy, and the drag mechanism is not restricted in its size.

The fishing reel of its invention, which supports the spool shaft with the spool rotatably to the reel body so that the handle is operated to drive the spool through a transmission mechanism for winding up the line on the spool, includes a handle supported at an intermediate portion of the handle shaft, which in turn is supported to the reel body, and a drag mechanism disposed on the handle shaft between the axial end thereof and the handle. The handle is interposed between the reel body and the drag mechanism to thereby approach the axial center of the spool.

In detail, the handle shaft projects outwardly from the reel body, the handle is supported at an intermediate portion of the projection, and the drag mechanism is provided between the outside surface of the handle and the projecting end of the handle shaft. This largely reduces the distance between the handle and the axial center of the spool.

Hence, this invention prevents the reel and rod from being subjected to a large moment of rotation when the handle is operated to wind up the line even under a sizable load, to thereby facilitate the handle operation to that extent.

Furthermore, the drag mechanism disposed as above-mentioned can be formed in a desired size without any restriction. Hence, the friction plates and contact plates can be increased in number to obtain a dragging force larger than the predetermined value and the drag mechanism can be of fine adjustment construction, thereby improving performance of the same.

The above and further objects and novel features of the invention will more fully appear from the following detailed description when the same is read in connection with the accompanying drawings.

BRIEF DESCRIPTION OF THE DRAWINGS

FIG. 4 is a sectional view of the FIG. 1 embodiment illustrating an engaging means coupling the main gear and the handle.

DETAILED DESCRIPTION OF THE INVENTION

Figure 1:
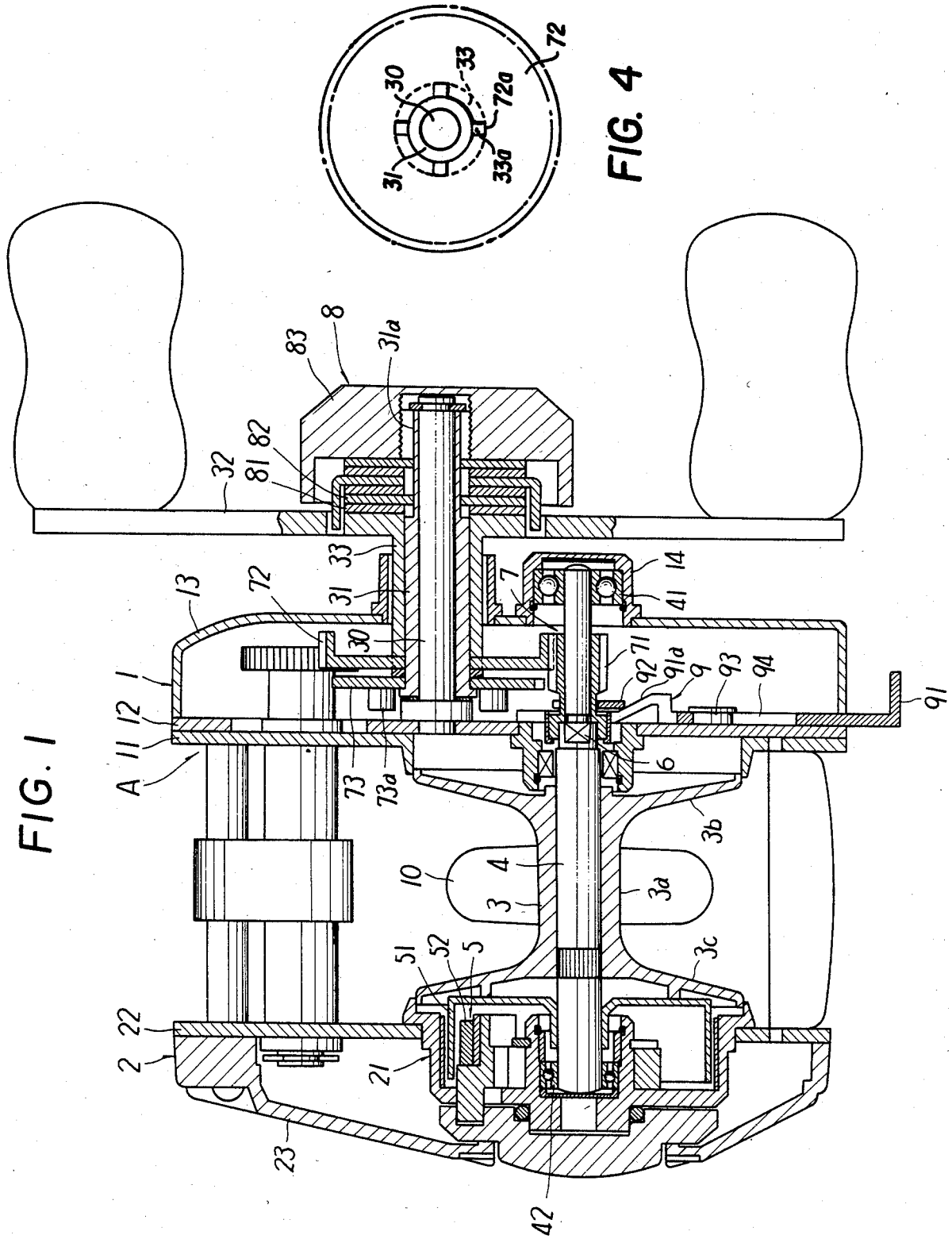
FIG. 1 is a cross-sectional view of an embodiment of a fishing reel of the invention.

Referring to FIG. 1, a double bearing fishing reel is shown, which uses a reel body A comprising a pair of first and second side frames 1 and 2 opposite to each other at the predetermined interval. The side frame 1 comprises a side plate 11, a doubling plate 12 attached to the outside thereof, and a cup-shaped cover 13 attached to the doubling plate 12 and having at its center a bearing cylinder 14. The second side frame 2 comprises a side plate 22 having a bearing housing 21 and a cup-shaped cover 23 attached to the outside of the side plate 22, with the bearing housing 21 containing therein a magnet brake 5 provided with an electric conductor 51 and a magnet 52 opposite thereto.

Between the bearing cylinder 14 at the first side frame 1 and the bearing housing 21 at the second frame 2, a spool shaft 4 supporting a spool 3 comprising a trunk 3a and a pair of flanges 3b and 3c extending radially outwardly from the both axial ends of trunk 3a, is supported rotatably through bearings 41 and 42 Handle shaft 31 extends in parallel to the axis of spool 3 is supported rotatably to the doubling plate 12 through a support shaft 30 and projects outwardly from the first side frame 1. Handle shaft 31 supports the handle 32 at an intermediate portion of the projecting shaft portion 31a of handle shaft 31. Also, the handle shaft 31 rotatably supports at its portion entering into the first side frame 1 a main gear 72 which constitutes together with a pinion 71 a transmission mechanism 7, so that a driving force from the handle 32 is transmitted to the spool shaft 4 through the handle shaft 31, main gear 72, pinion 71 and a clutch means 6 described in detail below to thereby drive the spool 3. Clutch lever 91 at the clutch operating mechanism 9 engages or disengages the clutch means 6, thus allowing the spool 3 to freely rotate.

The clutch means 6 comprises flat faces provided at an intermediate portion of spool shaft 4 and a cylindrical portion having not-round inner surface engageable with the flat faces and provided at the pinion 71 which is supported rotatably and axially slidably relative to the spool shaft 4. The cylindrical portion at the pinion 71 is disengaged from the flat portions at the spool shaft 4 to allow the spool 3 and spool shaft 4 to freely rotate when the clutch lever 91 moves forwardly.

Also, an anti-reverse-rotation gear 73 having a plurality of return protuberances 73a, is supported to the handle shaft 31 in relation of being not rotatable relative thereto, and is provided at its outer periphery with ratchet teeth engageable with an anti-reverse-rotation pawl (not shown) pivoted to the doubling plate 12, thereby preventing the reverse rotation of handle shaft 31.

The clutch operating mechanism 9 comprises a clutch yoke 92 holding the pinion 71 and urging it in the direction of engaging the clutch means 6 and a furcate clutch lever 91 having an urging portion 91a for urging the clutch yoke 92. Clutch lever 91 is supported to the doubling plate 12 in relation of freely reciprocating perpendicularly to the spool shaft 4 through a pin 93 and an elongate slot 94, and is biased backwardly by a return spring (not shown). Hence, in operation the clutch lever 91 is pushed to axially move the clutch yoke 92 to thereby move the pinion 71 in the direction of disengaging the clutch means 6, and the handle 32 is rotated to bring one return protuberance 73a at the anti-reverse-rotation gear 73 into contact with a contactor (not shown) provided at the utmost end of clutch lever 91 to thereby return the clutch lever 91 by means of the return spring, thus moving the pinion 71 by the urging force of clutch yoke 92 in the direction of engaging the clutch means 6. Incidentally, the clutch lever 91 is swingable around the pin 93 fixed to the doubling plate 12 and has at the utmost end an engaging portion, which engages with a stepped cutout at the doubling plate 12 to hold the clutch lever 91 at the termination of forward movement thereof.

Next, explanation will be given on a drag mechanism 8 of the essential point of the invention.

The handle 32 is provided not at the projecting end of handle shaft 31, but at an intermediate portion of the projecting shaft portion 31a of handle shaft 31 and in proximity to the first side frame 1. Drag mechanism 8 is being interposed between the outside surface of handle 32 and the axial end of projecting shaft portion 31a.

In further detail, in a first embodiment as shown in FIG. 1, a tubular shaft 33 projects integrally from the root of handle 32 and is fitted rotatably on the handle shaft 31, and a recessed engaging portion is provided at one of the outer surface of the axial end of tubular shaft 33 and the central portion of main gear 72 which is fitted freely onto the handle shaft 31, and a projecting engaging portion engageable with the recessed portion is provided at the other to thereby transmit a driving force from the handle 32 directly to the main gear 72. FIG. 4 shows recessed engaging portion 72a formed in the outer surface of main gear 72 and projecting engaging portion 33a projecting from shaft 33. The drag mechanism 8 comprises a plurality of friction plates 81, contact plates 82 abutting thereagainst, and a drag knob 83, with the friction plates 81 being supported rotatably onto the projection shaft 31a and positioned outwardly beyond the handle 32. One friction plate 81 is brought into contact with the outside surface of handle 32 and another one 81 is retained to the handle 32. Contact plates 82 are supported not rotatably but axially movably onto the projecting shaft 31a, and the drag knob 83 is screwed with the utmost end of shaft 31a and can be rotated to axially move the contact plates to be in press-contact with the friction plates, so that when the spool 3 is subjected to a pulling force from the line in the direction of reverse rotation of the spool 3, the handle 32, main gear 72 engageable therewith, and pinion 71, are given resistance against the reverse rotation with respect to the handle shaft 31 restricted from its reverse rotation.

In other words, a hooked fish pulls the line to give to the spool 3 a load corresponding to a pull of the fish, through the line, whereby a biasing force is applied to spool 3 which would tend to cause it to rotate in the reverse direction.

In this case, the anti-reverse-rotation gear 73 restrains the handle shaft 31 from reverse rotation, but the pinion 71, main gear 72 and handle 32, which are all in condition of being rotatable with respect to the handle shaft 31, thereby would tend to reversely rotate. However, the drag mechanism 8 interposed between the handle 32 and the handle shaft 31 applies a resistance to the handle 32 against its reverse rotation with respect to the handle shaft 31.

Accordingly, when the load on the spool 3 is smaller than a resistance set by the drag knob 83, the spool 3 does not rotate reversely, but when the load overcomes the resistance, the drag mechanism 8 slips to allow the transmission mechanism 7 and handle 32 to reversely rotate with respect to the handle shaft 31.

Next, explanation will be given on the use of the fishing reel of the invention constructed as abovementioned.

At first, the fishing reel is mounted to the fishing rod through the mounting leg 10 provided at the center between the first and second side frames 1 and 2. In the case where the clutch means 6 is engaged to put the reel in the line winding mode, an angler grips by his one hand the reel mounting portion at the rod together with the second side frame 2 and rotates the handle by his other hand. The driving force of handle 32 is transmitted from the handle 32 to the spool 3 through the tubular shaft 33, main gear 72, pinion 71, clutch means 6 and spool shaft 4, thereby rotating the spool 3 for winding thereon the fishing line.

In this case, since the drag mechanism 8 is positioned outside the first side frame 1 and axially outwardly beyond the handle 32 so that a distance between the handle 32 and the center of the interval between the flanges 3b and 3c, is reduced, the moment of rotation acting on the reel mounted on the rod, when the handle 32 is operated, is reducible to a minimum, thereby facilitating the rotation of handle 32.

Incidentally, when the line is wound onto the spool 3, the driving force from the handle 32 is transmitted to the handle shaft 31 through the friction plates 81 and contact plates 82 to thereby rotate the handle shaft 31 simultaneously with the handle 32. Since the handle shaft 31 is restrained from reverse rotation by engagement of the anti-reverse-rotation pawl with the ratchet teeth provided at the outer periphery of anti-reverse-rotation gear 73, the handle 32 in the mode of winding up the line, cannot be rotated reversely under a force smaller than the dragging force of drag mechanism 8.

Next, when a hooked fish pulls the line in its winding-up mode and the line is subjected to tension, the tension applies to the spool 3 a force in the direction of its reverse rotation, with this force acting on the handle 32 via the spool shaft 4, clutch means 6, pinion 71, main gear 72 and tubular shaft 33. At this time, upon releasing the handle from the angler's hand, the drag mechanism 8 is actuated so that when the tension acting on the fishing line is larger than the dragging force of drag mechanism 8, a slip is developed between the friction plates 81 and the contact plates 82, whereby the handle 32 reversely rotates with respect to the handle shaft 31 to lead to drawing-out of the line from the spool 3, thus solving the problem of a cut of the fishing line when subjected to a load exceeding its strength.

Figure 2:
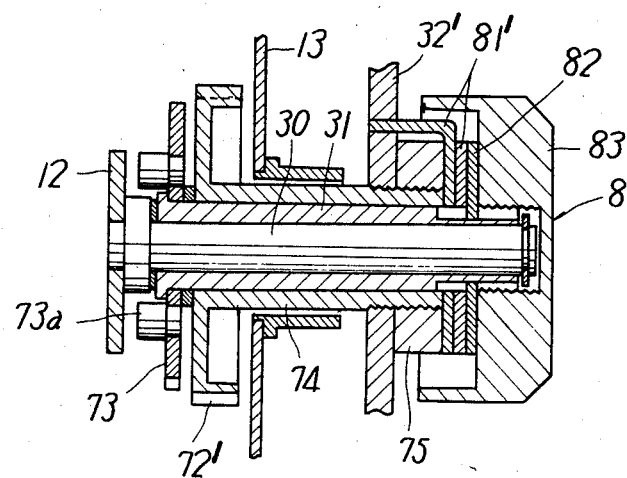
FIGS. 2 and 3 are partial sectional views of two modified embodiments of the invention respectively.

Alternatively, the main gear 72' may be provided integrally with a tubular shaft 74 freely fitted onto the handle shaft 31 as shown in FIG. 2, with the tubular shaft 74 supporting at the outer periphery of the utmost end thereof the handle 32'. Screw member 75 may screw with the utmost end at the tubular shaft 74 to thereby fix the handle 32' thereto.

Figure 3:
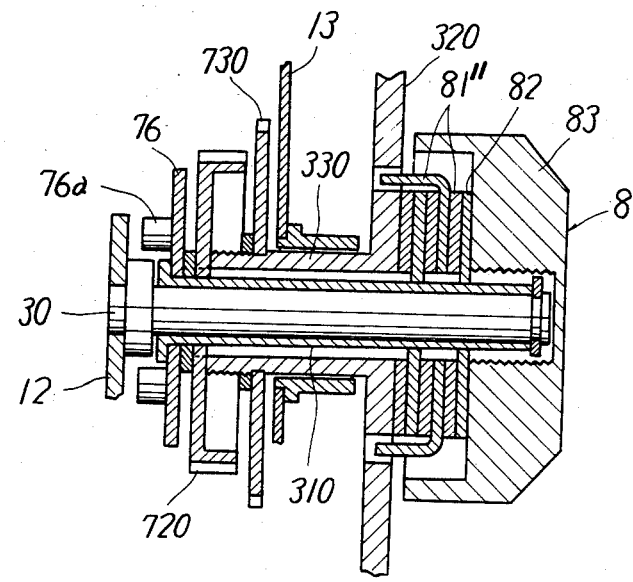

Also, a main gear 720 may, as shown in FIG. 3, be supported to a handle shaft 310 not-rotatably relative thereto and an anti-reverse-rotation gear 730 is supported to a tubular shaft 330 at the handle 320, so that the driving force therefrom may be transmitted to the main gear 720 through the drag mechanism 8.

Thus, when a load on the spool 3 driven by the handle 320 to wind up the line overcome the dragging force set by the drag mechanism 8, the handle 320, while rotating, slips to stop the rotation of handle shaft 310. Or, in a case where the load on the spool 3 increases to reversely rotate the spool 3, the handle 320 is held by the angler's hand to restrain the reverse rotation, thereby applying to the spool 3 a resistance against reverse rotation. Also, when the load overcomes the resistance, the handle 320 in stationary condition enables the handle shaft 310 to rotate reversely. In addition, in FIG. 3, reference numeral 76 designates a return plate having return protuberances 76a, and the drag mechanism 8 and other components in common with those in FIGS. 1 and 2 are designated by the same reference numerals.

Alternatively, the bearing cylinder 14 in FIG. 1 may be provided at the doubling plate 12 so that the spool shaft 4 may be supported at one axial end to the doubling plate 12.

Also, the present invention can be applied to a single bearing reel which supports the spool 3 to the first side frame 1 in cantilever fashion.

Although several embodiments have been described, they are merely exemplary of the invention and not to be construed as limiting, the invention being defined solely by the appended claims.

What is claimed is:

1. A fishing reel, comprising a reel body, a spool having a spool shaft supported rotatably to said reel body, a handle shaft supported rotatably to said reel body, a handle supported to said handle shaft for applying to said spool a driving force to drive said spool, a transmission mechanism for transmitting the driving force from said handle to said spool, said handle shaft projecting outwardly relative to said reel body, said handle being supported on said handle shaft at an intermediate portion of said handle shaft, said handle shaft projecting outwardly relative to said handle, and a drag mechanism for applying a resistance to reverse rotation of said handle relative to said handle shaft, said handle being interposed between said reel body and said drag mechanism, said transmission mechanism comprising a main gear rotatably supported to said handle shaft, a pinion engageable with said main gear and supported to said spool shaft, an anti-reverse-rotation gear, and engaging means for coupling said main gear and said handle such that a driving force can be transmitted by said handle to said main gear, said anti-reverse-rotation gear being fixed to said handle shaft.

2. A fishing reel according to claim 1, wherein said handle comprises a first tubular shaft supported rotatably to said handle shaft and said engaging means is comprises means for coupling said first tubular shaft and said main gear.

3. A fishing reel according to claim 1, wherein said main gear comprises a tubular shaft supported rotatably to said handle shaft, and said tubular shaft comprises fixing means for fixing said handle to said tubular shaft.

* * * * *